Figure 1:
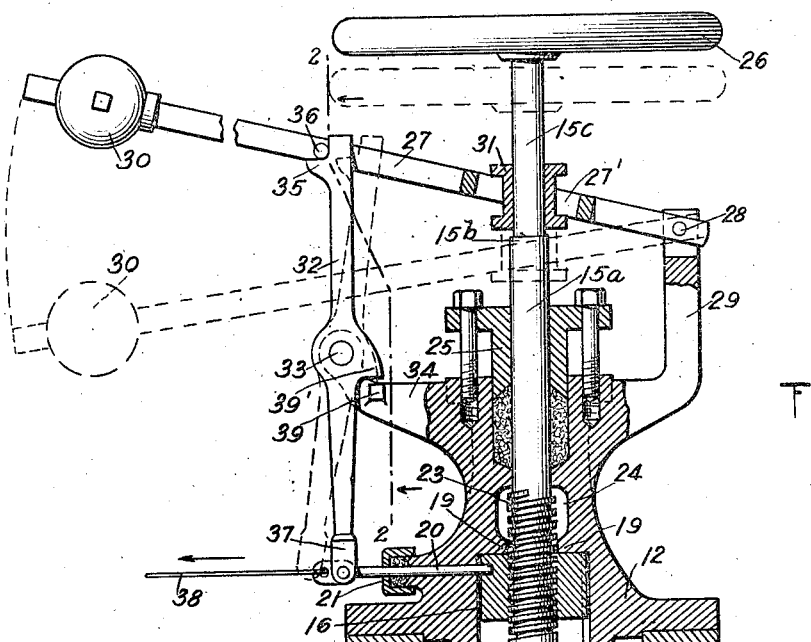

C. WIDMANN.
EMERGENCY VALVE.
APPLICATION FILED NOV. 20, 1918.

1,295,658.

Patented Feb. 25, 1919.

WITNESSES

INVENTOR
Carl Widmann
BY
ATTORNEYS

UNITED STATES PATENT OFFICE.

CARL WIDMANN, OF WEST NEW YORK, NEW JERSEY.

EMERGENCY-VALVE.

1,295,658.       Specification of Letters Patent.      Patented Feb. 25, 1919.

Application filed November 20, 1918. Serial No. 263,343.

*To all whom it may concern:*

Be it known that I, CARL WIDMANN, a citizen of the United States, and a resident of West New York, in the county of Hudson and State of New Jersey, have invented a new and Improved Emergency-Valve, of which the following is a full, clear, and exact description.

This invention relates to safety appliances for factories, workshops, or the like, where there is employed a prime mover for various machines, in the nature of a steam engine or its equivalent, and has particular reference to means for instantly shutting off the steam to the engine whereby the engine will stop and the machinery quickly come to rest thereafter in the event of an accident or any emergency requiring such control of the prime mover.

More definitely stated by this invention I provide a means whereby any person in the factory and any distance from the engine room may be able by any means, as a cord or wire suitably located at any part of the factory to cause the instant shutting off of the steam in case of emergency.

Another object of the invention is to provide an emergency steam valve which, in addition to the emergency facilities above referred to, is adapted to be closed or opened by the engineer for the usual purposes the same as any ordinary valve.

While I am aware that steam valves for the same general purpose as mine have been proposed heretofore, yet in my experience I have found that the previous devices are of a relatively complicated nature, difficult to understand and manipulate, and hence liable to fail in an emergency or become inoperative. One of my further objects, therefore, is to provide a valve of the simplest possible construction and one which cannot fail to operate when the demand arises.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 2:
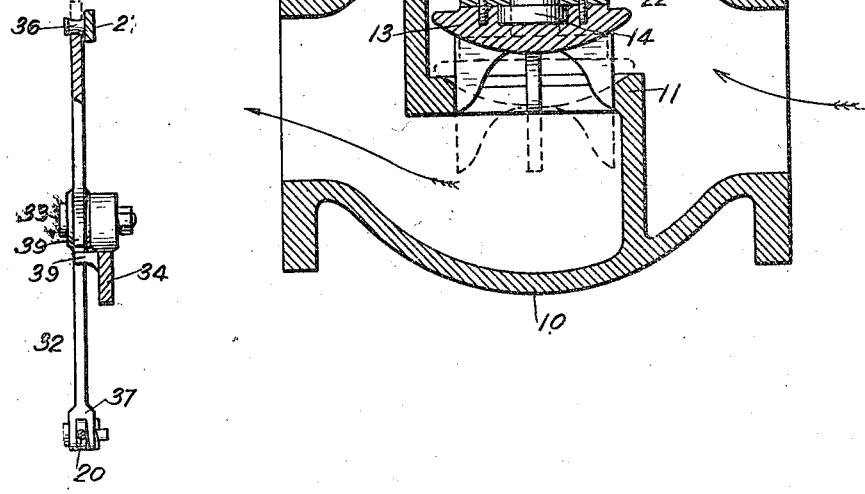

Figure 1 is a vertical sectional view showing my improved valve in normal open operative position, the emergency closed position of the valve being indicated in dotted lines; and Fig. 2 is a vertical sectional detail on the broken line 2—2 of Fig. 1.

Referring now more particularly to the drawings, I show a valve casing 10 of a well known type and provided with a valve seat 11 through or over which power fluid such as steam is adapted to flow in the direction indicated by the arrows. The bonnet 12 in general is similar to that part usually employed in connection with the open side of the valve casing and through which the adjustable valve devices are actuated. This bonnet, however, is somewhat longer than the usual bonnet.

The valve 13, adapted to close upon the seat 11, is swiveled upon the head 14 of a screw threaded valve stem 15 having adjustable threaded engagement in or along a nut 16 located in and adjustable vertically bodily along a cavity 17 formed along the axis of the bonnet. I am not particularly concerned about the cross sectional form or design of the nut and cavity 17, but if they are made circular I will provide a key 18 to prevent rotation of the nut while permitting bodily sliding movement thereof along the cavity. The nut is adapted to abut normally against a shoulder 19 above it in which position it is locked by means of a pin 20 slidable through the wall of the cavity 17 in a direction perpendicular to the axis of the valve stem 15. The pin is surrounded by means of a packing gland 21 making a steam tight closure for the hole through which the pin is slidably fitted.

In the normal open position the valve 13 abuts against a cap or plate 22 secured to the inner portion of the bonnet and constituting a closure for the cavity 17 preferably, however, not steam tight. The valve stem is adapted to reciprocate through the center of said cap or plate 22. The threaded portion 23 of the valve stem is approximately twice as long as the depth of the nut 16 and in the normal open position of the valve it extends upward above the nut into a cored cavity 24 just below the main packing gland 25 through which the middle reduced portion 15ª of the valve stem is adapted to reciprocate freely in practice. The upper end of this portion 15ª terminates in a shoulder 15ᵇ above which is the smallest portion 15ᶜ upon which the hand wheel 26 is secured.

27 indicates a lever pivoted at 28 upon a rigid arm 29 carried by one side of the bonnet. On the outer end of the lever is adjustably fitted a heavy weight 30 the tendency of which is to cause the lever to swing downward around the pivot 28. At 27' the lever is formed into a yoke which embraces a collar 31 loosely fitted upon the smallest cylindrical portion 15ᶜ of the valve stem and normally spaced slightly above the shoulder 15ᵇ. 32 indicates a rigid strut pivoted at 33 upon an arm 34 extending outward and upward on that side of the bonnet opposite the valve stem from the arm 29. Adjacent to the upper end thereof the strut 32 is provided with a lug 35 projecting outward from the valve stem or toward the weight 30 and upon which a stud 36 carried by the lever 27 is normally supported. The lever 27 being normally supported with the weight 30 above the horizontal plane of the pivot 28, the natural effect of gravity acting through the stud 36 and lug 35 tends to cause rotation of the top portion of the strut to the left or outward, since the point of contact between the lug and stud is to the left or outward from the vertical plane of the pivot 33. This movement, however, of the strut is prevented by engagement of the inner end of the pin 20 in the nut. It is to be noted especially that the intended release of the lever by an outward pull on the lower end of the strut is not materially resisted by the weight borne by the lever 27. The pin 20 is loosely pivoted in a fork 37 at the lower end of the strut and to this outer end of the pin or the lower end of the strut may be secured one or more cords or wires 38 which may lead over any suitably arranged guides or direction pulleys throughout the factory and so be accessible to anyone in or about the factory who may pull upon the same in case of emergency. The relative proportions of the pin 20 and the lug 35 are such that the pin is first released from the nut and then immediately thereafter the lug 35 passes inward beyond the stud 36 allowing the weight to drop bringing the collar 31 forcibly into contact with the shoulder 15ᵇ with the result that the effect of the weight thus descending will bring the valve, valve stem, and nut, all bodily downward to the dotted line position of Fig. 1 completely closing the valve. Any suitable means such as a finger 39 carried by the outer portion of the arm 34 and adapted to be engaged by a lug 39' on the strut may be provided to limit the swing of the strut and hence the extent of withdrawal of the pin 20 from the bonnet so as to prevent the escape of steam through the gland 21.

The engineer may pull the cord 38 if desired for ordinary stopping of the engine, but ordinarily he will turn the hand wheel to the right in the usual manner to bring the valve to its closed position leaving the nut in the position shown in full lines in the drawing. When, however, the valve is closed by the dropping of the weight and sliding movement of the nut as shown in dotted lines the valve is restored to normal open position again as follows: The weight being down and the top of the strut being tilted inward toward the valve stem the pin 20 will be held temporarily out of the path of the nut. The operator on turning the hand wheel and valve stem toward the right, the head 14 turning in the valve 13, the nut will be elevated by virtue of the action of the thread 23 upon the nut until the nut is caused to strike against the shoulder 19. The valve stem and valve swiveled thereon will, however, remain in their closed position, and the weight still in its dropped position will then be lifted by the operator and supported upon the strut bringing the pin 20 back into its normal locking position. The operator next will turn the wheel 26 and valve stem toward the left whereby the valve and valve stem will be moved upward to open position ready for a subsequent operation.

I claim:

1. In an emergency valve, the combination of a valve casing having a valve seat therein, a bonnet connected to the casing and having a cavity therein, a valve coöperating with the seat, a valve stem to which the valve is connected, the stem extending through the bonnet and cavity, a nut within the cavity with which the valve stem has threaded engagement, the nut being bodily movable along the cavity, a pin projecting through the wall of the cavity and normally projecting into the nut to hold it in position against the upper end of the cavity with the valve open, a collar loosely surrounding the upper end of the valve stem, the stem having a shoulder below the collar against which the collar is adapted to impinge, a weighted member embracing the collar and tending to force it downward, and means coöperating with said pin and the weighted member serving to release the pin from the nut and to set free the weighted member to cause the immediate closing of the valve.

2. In an emergency valve, the combination with a valve casing having a seat therein, a casing bonnet, a valve stem movable through the bonnet and a valve connected to the inner end of the stem, of automatic means to cause the bodily closing of the valve, said automatic means comprising a weighted lever pivoted to one side of the bonnet and extending from its pivot past the valve stem beyond the opposite side of the bonnet, a strut pivoted on a pivot on the opposite side of the bonnet from the lever pivot, the strut having a lug projecting therefrom outward from the vertical plane of its pivot and a stud projecting from the lever and resting normally upon said lug, means to tilt the upper end of the strut toward the valve stem carrying the lug from beneath the stud, and a sliding member upon the valve stem coöperating with the shoulder thereon and engageable by the weighted lever, substantially as set forth.

CARL WIDMANN.

Copies of this patent may be obtained for five cents each, by addressing the "Commissioner of Patents, Washington, D. C."